April 7, 1931.  F. RICKS ET AL  1,799,320
LIP TURNING AND SETTING MACHINE
Filed Aug. 18, 1928
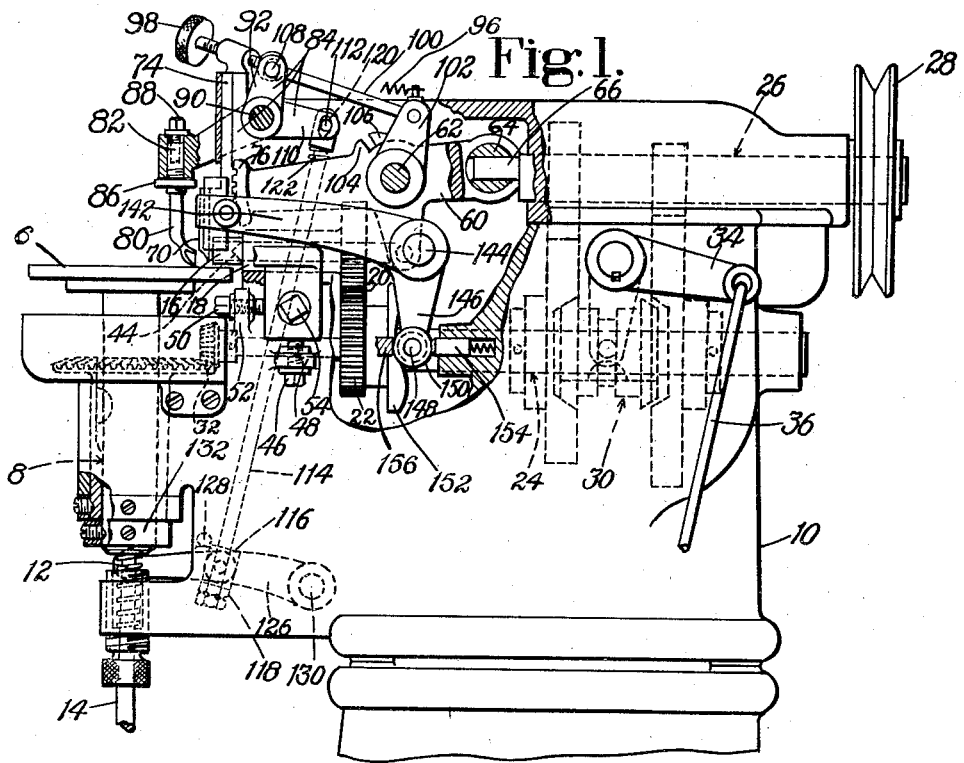
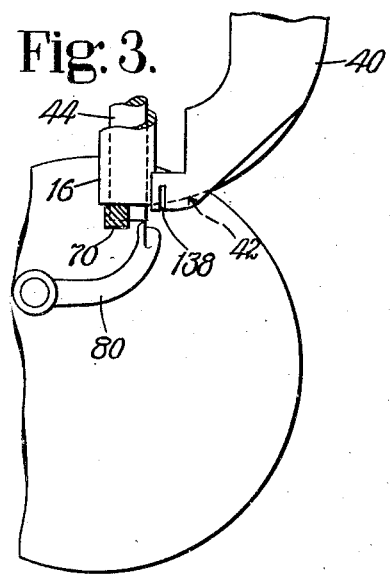
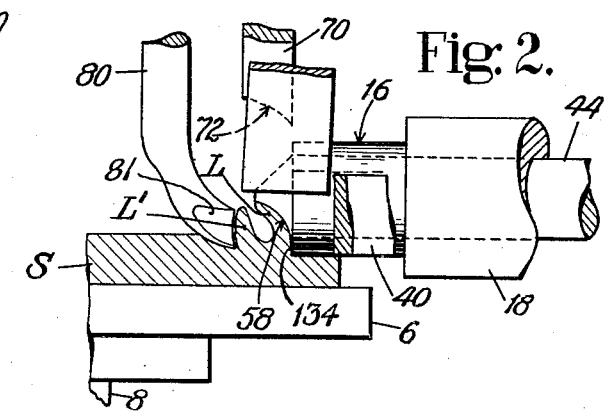
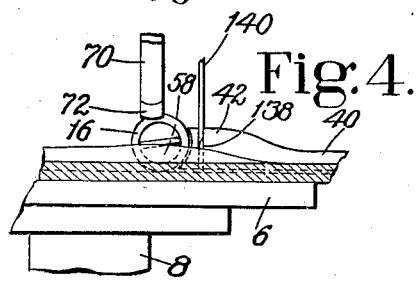
INVENTORS
Fred Ricks
Alfred E. Richards
By their Attorney,
Harlow M. Davis Patented Apr. 7, 1931

1,799,320

UNITED STATES PATENT OFFICE

FRED RICKS AND ALFRED EDWARD RICHARDS, OF LEICESTER, ENGLAND, ASSIGNORS TO UNITED SHOE MACHINERY CORPORATION, OF PATERSON, NEW JERSEY, A CORPORATION OF NEW JERSEY

LIP TURNING AND SETTING MACHINE

Application filed August 18, 1928, Serial No. 300,502, and in Great Britain September 15, 1927.

This invention relates to lip turning and setting machines. As herein illustrated, the invention is embodied in a machine which is particularly adapted for turning and setting the lips of double-lipped all-leather welt insoles, although the invention is by no means limited to such use since it is advantageously applicable to operations upon soles of other types.

One object of the present invention is to provide an improved lip turning and setting machine which is capable of operating at high speed but which nevertheless may be relied upon to turn the lips of easily tearable, flimsy, insole stock without having any appreciable tendency to injure the lips, particularly at their base portions, or to tear or injure the between substance.

With this object in view one feature of the invention consists in the combination with means for feeding continuously a double-lipped insole, of separate lip setting hammers which are moved into and out of engagement with the inner and outer lips respectively to impart lip setting blows in alternation thereto.

In the embodiment of the invention herein illustrated the work feeding means comprises a continuously driven rotary work supporting feed table and a continuously driven hollow feed roll which is mounted above the feed table and co-operates therewith, the feed roll having a periphery adapted to engage the feather of an insole and an end face adapted to engage the material at the base of the outer lip of the insole over a considerable area. As shown, the lip turning and setting means comprise a plow for initially raising or turning the outer lip; a horizontally reciprocating lip turning and setting hammer mounted for movement within the hollow feed roll into engagement with the outer lip above the portion engaged by the end face of the feed roll; an inner lip turning and setting member movable into and out of operative engagement with the inner lip; and a vertically reciprocating lip setting member for engaging the outer lip and the edge portion of the inner lip, thereby setting the outer lip and inner lip, and bringing the lips together. The illustrated inner lip turning and setting member is arranged to be retracted from operative position while the outer lip is being acted upon by the horizontally reciprocating outer lip turning and setting member, thereby to avoid gripping of the lips between said members and the resulting interference with the desired continuous feed of the work. As illustrated, also, the inner lip turning and setting member is arranged to deliver a blow against the inner lip while the horizontally movable outer lip turning and setting member is inactive and the vertically movable lip setting member is arranged to engage the work while the inner turning and setting member is operative, this arrangement facilitating the setting of the inner and outer lips in upstanding positions with their edges in contact. The illustrated hollow feed roll is constructed and arranged to form a square shoulder at the base of the outer lip, thus better fitting the sole to receive the inseam stitches.

The invention further consists in features of construction and arrangements of parts hereinafter described and claimed.

The invention will be described with reference to the accompanying drawings, in which Fig. 1 is a view, partially in side elevation and partially in section, of a machine embodying the present invention;

Fig. 2 is a detailed view, in side elevation and on an enlarged scale, of the operating instrumentalities of the machine, illustrating their mode of operation upon a double-lipped, all-leather welt insole;

Fig. 3 is a plan view of the operating devices shown in Fig. 2 with the lip slitting knife omitted; and Fig. 4 is a front elevational view of certain of the operating instrumentalities.

The insole lip turning and setting machine shown in the drawings is provided with a circular work supporting table 6 which is rotated continuously about a vertical axis during the operation of the machine to feed an insole to and past the lip turning and setting instrumentalities. The table 6 is secured to the upper end of a spindle 8 journaled in suitable bearings in a frame 10. The table 6 is arranged to be urged upwardly by a spring 12 and to be lowered from work supporting position to facilitate the presentation of the work to the machine and its removal therefrom by means of a treadle, not shown, which is connected with the spindle 8 by a rod 14.

Co-operating with the table 6 to feed the work is a tubular feed roll 16 having a longitudinally grooved or otherwise roughened exterior surface, the roll being arranged to project over the edge of the table 6 so as to engage the upper side of the feather of a sole on the table. The feed roll 16 is continuously rotated during the operation of the machine about a horizontal axis, the peripheral speed of the roll and of the table being the same.

The tubular feed roll 16 is formed as the reduced extension of a sleeve 18 which is rotatably mounted in the frame 10. The sleeve 18 has secured to its rear portion a gear 20 which meshes with a gear 22 fast on a horizontal shaft 24 which is mounted in the frame 10 below a horizontal main shaft 26. The main shaft 26 is provided with a driving pulley 28 adapted to be connected with a suitable source of power. The shaft 24 is driven from the main shaft 26 through a two-speed gear mechanism located within the frame 10 and indicated conventionally by dotted lines at 30. The table 6 is driven from the shaft 24 which, as shown, extends forwardly beyond the gear 22 and is connected with the table by intermeshing bevel gears 32. The two-speed mechanism 30 is arranged to be controlled by the operator through a lever 34 and a treadle rod 36 so that the rate of speed of the work with relation to the speed of the operating instrumentalities may be varied at the will of the operator. For example, when operating along a comparatively straight portion of a sole, the high speed may be used, and when operating along the more or less sharply curved portion of the sole, such as at the toe, the slow speed may be used.

For the purpose of opening the outer channel and raising the outer lip into position to be acted upon by the lip setting instrumentalities, the machine is provided with an outside lip turning tool consisting of a plow 40 fixedly secured to the frame 10, the plow being located in front of the feed roll 16 and the lip setting devices, i. e., in position to operate upon a portion of the lip before that portion is engaged by the feed roll and acted upon by the lip setting means. As best shown in Fig. 4, one end of the lip turning plow 40 is located close to the feed roll 16, the end face of the plow being curved to correspond with the curvature of the roll. The operative face 42 of the plow is shaped to turn up the outer lip of an insole (such as the lip L of the double-lipped all-leather welt insole S shown in Fig. 2) as the sole is fed through the machine into the path of a horizontal lip turning and setting hammer 44. The plow 40 is adjustably mounted on the frame 10 and may be adjusted vertically to accommodate different thicknesses of work by means of a screw 46 (Fig. 1) rotatable in a lug 48 on the frame and threaded into the plow. To adapt the plow 40 for operation in channels of different depths the plow may also be adjusted forwardly and rearwardly of the machine by means of a screw 50 rotatable in a lug 52 on the frame 10 and threaded into the plow. A binding screw 54 is provided for fixedly securing the plow in any position to which it is moved by the screws 50 and 46.

The lip turning and setting hammer 44 has a curved work engaging end face 58 for engaging the outer side of the outer lip L. As shown, the hammer 44 is slidingly mounted coaxially with the feed roll 16 within a bore in the feed roll and the hammer is rapidly reciprocated to bend and set the lip L. The hammer 44 is connected at its rear end by a pin-and-slot connection to one arm of a lever 60 which is fixed on a shaft 62 rotatably mounted in the frame 10. Another arm of the lever 60 has slidingly and rotatably mounted in it a pin 64 which is bored transversely of its axis to receive a crank 66 formed on the inner end of the main shaft 26. As the main shaft 26 rotates, the lever 60 is rocked on its axis by the action of the crank 66 and consequently the hammer 44 is reciprocated within the tubular feed roll 16.

Co-operating with the horizontally reciprocating hammer 44 in the setting of the outer lip L is a hammer 70 having a curved work engaging face 72 at its lower end. The hammer 70 is adapted to reciprocate vertically in sliding contact with a vertical end face of the tubular feed roll 16 to engage the lip L after it has been turned inwardly by the hammer 44 and to bend the lip downwardly thus completing the setting of the outer lip, the hammer 70 being positioned for this purpose just to one side of the axis of the feed roll 16, as is shown clearly in Figs. 3 and 4. As shown in these figures the hammer 70 is so dimensioned that its lower end operates wholly within a space outlined by a forward projection of the periphery of the feed roll 16. The vertical lip setting hammer 70 is formed on the lower end of a slide 74 (Fig. 1) mounted for vertical reciprocation in the frame 10. The slide 74 has formed on its rear face rack teeth which mesh with the teeth of a gear segment 76 formed on a third arm of the lever 60, the arrangement being such that as the horizontal hammer 44 moves away from the work the vertical hammer 70 moves downwardly toward the work. In its hammering action the vertical hammer 70 bends the lip over and down and brings the edges of the lips L and L' together.

For raising the inner lip of a sole, such as the lip L' shown in Fig. 2, and opening the inner channel, the illustrated machine is provided with an inside lip turning and setting tool 80 having a plow-like portion 81 (Fig. 2) for entering the channel beneath the lip. The tool 80 is provided with a stem 82 (Fig. 1) which is adjustably clamped in one arm of a lever 84 by a nut 86 threaded on the lower end of the stem 82 and a screw 88 threaded into the stem and engaging the said lever arm. The nut 86 and the screw 88 enable the tool 80 to be adjusted vertically in accordance with the thickness of the work and depth of the inner channel cut, and to be fixedly secured in adjusted position. The lever 84 is mounted to turn on a shaft 90 mounted in the frame 10 and has an arm 92 which is held by a spring 96 against an adjustable stop screw 98 carried by the frame. Adjustment of the screw 98 will swing the lever 84 about the shaft 90 and thus adjust the tool 80 toward or from the plow 40 to accommodate different thicknesses of between substance. The arm 92 of the lever 84 is connected by a link 100 with an arm 102 pivotally mounted on the shaft 62, the spring 96 being connected at one end to the arm 102 and at the other end to the frame 10.

The lip turning and setting tool 80 is shaped at its lower extremity, as shown in Figs. 2 and 4, so as readily to enter the inner channel and raise the inner channel lip and more or less roll it over toward the outer lip. As the horizontal lip setting hammer 44 is moved forwardly to engage the outer lip L, the tool 80 is swung slightly backward against the action of its spring 96 by means of a lug 104 on the lever 60, the lug 104 being arranged to engage a lug 106 on the arm 102. This swinging movement of the tool 80 away from the lip L' prevents the channel lips L and L' from being gripped between the hammer 44 and the tool 80 and prevents the feed of the work, which is intended to be continuous, from being interrupted or retarded. The fact that the inner lip turning and setting tool 80 is retracted from the inner lip when the hammer 44 strikes the outer lip also helps to prevent injury to the between substance. After the outer lip L has been disengaged by the hammer 44, the tool 80 is returned by the spring 96 into engagement with the inner lip L'. This return movement causes a blow to be imparted to the lip L' by the tool 80 as the hammer 44 recedes and this blow turns up and assists in setting the inner lip. The tool 80 is returned into engagement with the inner lip in time to support it against the blow delivered against its upper extremity by the vertical hammer 70 and thus assists in setting the inner and outer lips in close contact with each other. The connection between the arm 92 and the link 100 is an eccentric pin 108 by means of which the arm 102 may be adjusted about the shaft 62 to vary the space between the lugs 104, 106 and thereby to vary the amount of movement away from the plow 40 which is to be imparted to the tool 80.

The lever 84 has a third arm 110 which is connected to the treadle which lowers the work table 6 so that as the table is lowered the tool 80 is swung away from the feed roll 16 to permit insertion or removal of work. To this end, the arm 110 is connected by a pin 112 to the upper end of a rod 114 the lower end of which passes through a block 116 and has on its lower end a nut 118 arranged to engage the under side of the block. The upper end of the rod 114 is slotted at 120 to receive the pin 112 and the slot 120 enables the lever 84 to be swung during the operation of the machine as hereinbefore described without affecting the rod 114. A spring 122 surrounds the rod 114 and at its upper end bears against a head on the rod and at its lower end against a portion of the frame 10 through which the rod passes. The spring 122 holds the nut 118 up against the block 116 and holds a lever 126 by which the block 116 is carried against a stop pin 128 on the frame. The lever 126 is pivoted at 130 to the frame 10 and extends beneath a collar 132 on the table spindle 8 so that when the work table 6 is lowered the inner lip turning and setting tool 80 is swung away from the plow 40.

The above-described arrangement whereby the horizontal hammer 44 operates through the tubular feed wheel 16 prevents the hammer from beating against and tearing the root of the outer lip and by means of this arrangement also there is formed at the root or base of the outer lip a square shoulder, this shoulder being produced by the pressure of the end face of the feed roll 16 against the root of the lip. This square shoulder at the base of the outer lip (which is indicated at 134 in Fig. 2) provides a surface appropriately disposed to receive the point of the needle in the subsequent welt-sewing operation.

While the feed of the work in the operation of the illustrated machine has hereinbefore been referred to as continuous, it should be pointed out that the distance the work travels between each stroke of the lip setting hammers is considerably less than the width of the hammers 44 and 70, being approximately ⅛ of an inch, and inasmuch as the width of the work engaging faces of the hammers is substantially greater than the distance of work travel between successive hammer strokes each portion of the lip will receive more than a single blow from each hammer.

The plow 40 has formed in it a vertical groove 138 (Figs. 3 and 4) in which a vertically reciprocating lip slitting knife 140 operates, the knife 140 being thrown into action when needed to slit the channel lips where the contour of the sole is more or less abruptly curved so as to allow the lips to be readily set perpendicular to the surface of the insole. The knife 140 is clamped to one arm 142 of a bell crank lever pivoted at 144 to the frame 10. A second arm 146 of the bell crank lever has slidingly mounted in it a pin 148 having mounted thereon a cam roll 150 adapted in one position of the pin 148 to be engaged by a cam 152 fixed on the shaft 24. The pin 148 is adapted to be moved axially by means of a hand or treadle lever (not shown) to carry the cam roll 150 into or out of the path of the cam 152, and thus to render the slitting knife operative or inoperative as may be desired. A spring-pressed plunger 154 suitably mounted in a socket in the frame 10 engages the arm 146 and urges the cam roll 150 either against the cam 152 or against a portion 156 of the frame according to the axial position of the cam roll.

In operation, the inner and outer lips of an insole are initially raised by means of the stationary plow 40 and the tool 80 as the insole is fed continuously past these members. Without interfering with the feed of the work the horizontally reciprocating hammer 44 operates repeatedly upon the outer lip to turn it inwardly beyond the point to which it was turned by the plow 40 and to exert a preliminary setting action upon the lip. Alternating with the blows of the hammer 44 the blows of the vertically reciprocating hammer 70 complete the setting of the outer lip. The inner lip turning and setting member 80 is retracted from engagement with the inner lip when the hammer 44 strikes the outer lip thereby preventing the lips from being gripped in such a way as to interfere with the continuous feed of the work. Between successive blows of the hammer 44, however, the tool 80 is caused to strike yielding blows against the inner lip, the tool 80 co-operating at these times with the vertical hammer 70 in the setting of both the inner and outer lips and insuring that the lips will be set with their edges in contact.

When operating upon an insole such as a "Gem" insole in which the edge of the insole is split and one portion of the edge is turned up at right angles to the face of the insole so that only an outer lip is formed, the vertical hammer 80 may be dispensed with and the inner lip turning and setting tool 80 replaced by a tool having a flat, smooth, lower face arranged to bear against the root of the single lip at the side opposite to that engaged by the horizontal hammer 44, this tool operating in the same way as the tool 80.

Having thus described our invention, what we claim as new and desire to secure by Letters Patent of the United States is:

1. In a lip turning and setting machine, in combination, means for supporting and feeding a sole having a lip, a feed roll for co-operating with said means, said roll having a cylindrical peripheral surface for engaging the sole margin at the lipped side of the sole and having an end face perpendicular to the axis of the roll for engaging an area of substantial width at the base of the lip of the sole, and a lip setting member movable into and out of operative engagement with the upper portion of the lip.

2. In a lip turning and setting machine, in combination, a support for a sole having an inner and an outer lip, a hammer movable in a path parallel to the plane of a sole on the support into engagement with the outer side of the outer lip, a feed roll rotatable about an axis parallel to the path of movement of the hammer and arranged to engage the sole margin, said feed roll and said support being constructed and arranged to cooperate to feed the sole past the hammer, a member for turning the inner lip, and means for retracting the member when the hammer is in engagement with the outer lip.

3. In a lip turning and setting machine, in combination, means for supporting and feeding a sole having a double lip, two lip setting hammers arranged to engage the same side of the outer lip, means for operating the hammers to engage the outer lip in alternation and means for turning the inner lip constructed and arranged to be retracted and held away from the inner lip when one of the hammers engages the outer lip.

4. In a lip turning and setting machine, in combination, means for supporting and feeding a sole having an outer and an inner lip, a reciprocable hammer movable into engagement with the outer side of the outer lip, a tool for turning the inner lip, and means for reciprocating the hammer and for retracting the lip turning tool and holding it away from the inner lip during the engagement of the hammer with the outer lip.

5. In a lip turning and setting machine, in combination, means for supporting and feeding a sole having an outer and an inner lip, a reciprocable hammer movable into engagement with the outer side of the outer lip, a tool for turning the inner lip, means for reciprocating the hammer and for retracting the lip turning tool and holding it away from the inner lip during the engagement of the hammer with the outer lip, and means for causing the lip turning tool to strike a blow against the inner lip after the outer lip has been disengaged by the hammer.

6. In a lip turning and setting machine, in combination, means for supporting and feeding a sole having an outer and an inner lip, a reciprocable hammer movable into engagement with the outer side of the outer lip, a tool for turning the inner lip, means for reciprocating the hammer and for retracting the lip turning tool and holding it away from the inner lip during the engagement of the hammer with the outer lip, and yielding means for returning the lip turning tool into operative engagement with the inner lip.

7. In a lip turning and setting machine, in combination, means for supporting and feeding a double-lipped sole, means for turning both lips, a hammer movable into engagement with the outer lip to initiate the setting of said lip, and a second hammer movable into engagement with the outer lip and also into engagement with the edge of the inner lip after the withdrawal of the first hammer to exert a setting action upon the inner lip and complete the setting of the outer lip.

8. In a lip turning and setting machine, in combination, means for supporting and feeding a double-lipped sole, means for turning both lips, a hammer movable into engagement with the outer lip to initiate the setting of said lip, a second hammer movable into engagement with the outer lip and also into engagement with the edge of the inner lip after the withdrawal of the first hammer to exert a setting action upon the inner lip and complete the setting of the outer lip, and a member movable into engagement with the inner lip to co-operate with said second hammer in the setting of both lips.

9. In a lip turning and setting machine, in combination, feed mechanism comprising a feed table and a feed roll operating continuously and rotating about mutually perpendicular axes, and lip setting mechanism comprising two hammers movable in mutually perpendicular paths respectively parallel to said axes.

10. In a lip turning and setting machine, in combination, feed mechanism comprising a feed table and a cylindrical feed roll operating continuously and rotating about mutually perpendicular axes, and lip setting mechanism comprising two hammers movable in mutually perpendicular paths respectively parallel to said axes, the said hammers operating within the space bounded by a forward projection of the cylindrical feed roll.

11. In a lip turning and setting machine, in combination, work feeding means, and means for turning and setting the inner and outer lips of a double-lipped insole, said means including reciprocable members for engaging respectively the inner and outer lips and a third member operable to deliver blows simultaneously against the outer lip and the edge portion of the inner lip.

12. In a lip turning and setting machine, in combination, means for feeding continuously a double-lipped insole, a member for hammering the outer lip of the sole, and a member for hammering the inner lip of the sole, said members being moved into and out of engagement with the respective lips to impart to those lips respectively lip setting blows in alternation.

13. In a machine for turning and setting the lips of a double-lipped insole, in combination, means for continuously feeding the work, a reciprocating lip turning member movable in a path substantially parallel with the plane of the work into engagement with the outer lip, a member movable into and out of engagement with the inner lip but arranged to engage the inner lip only when the outer lip setting member is disengaged from the outer lip, and a third lip setting member movable in a path forming a large angle with the path of the outer lip setting member and arranged to engage both inner and outer lips while the inner lip is engaged by the inner lip turning member.

14. In a lip turning machine, in combination, a work support and a hollow roll constructed and arranged to co-operate in the feeding of a lipped insole, and a lip setting hammer extending through and slidingly mounted within said hollow roll, said hammer having a curved end face constructed and arranged to engage the outer surface of the lip of the insole to impart to said lip a transverse curvature corresponding to that of said end face.

In testimony whereof we have signed our names to this specification.

FRED RICKS.
ALFRED EDWARD RICHARDS.